Aug. 13, 1940.  W. F. KNEBUSCH  2,210,912
REEL STRUCTURE
Original Filed Feb. 1, 1936  2 Sheets-Sheet 1

INVENTOR
WALTER F. KNEBUSCH
BY
Charles E. Herrstrom
ATTORNEY

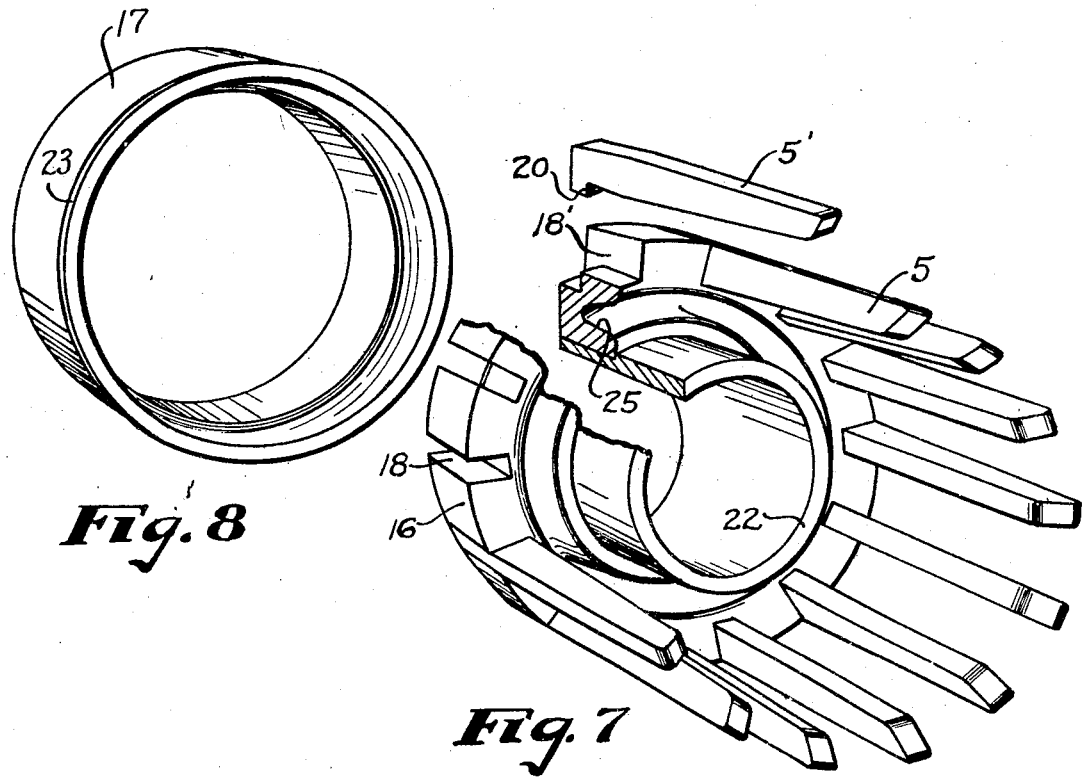
Fig. 8
Fig. 7
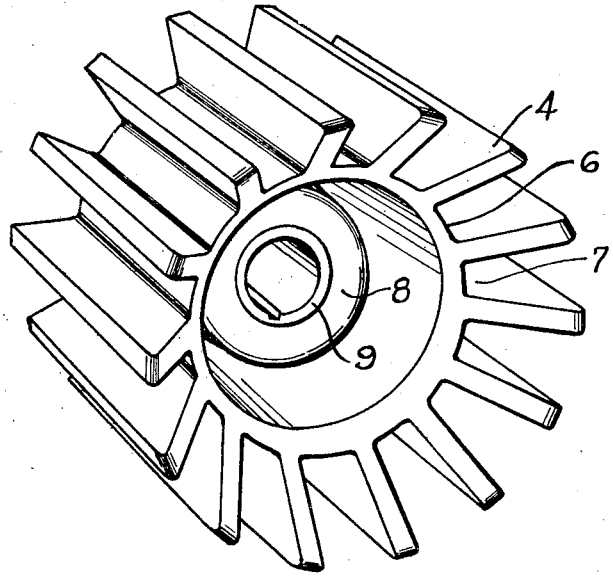
Fig. 6
INVENTOR
WALTER F. KNEBUSCH
BY Charles E. Herrstrom
ATTORNEY Patented Aug. 13, 1940

2,210,912

UNITED STATES PATENT OFFICE 2,210,912

REEL STRUCTURE

Walter F. Knebusch, Rocky River, Ohio, assignor to Industrial Rayon Corporation, Cleveland, Ohio, a corporation of Delaware Application February 1, 1936, Serial No. 61,953
Renewed July 18, 1939

20 Claims. (Cl. 242—53)

This invention relates to a reel on which threads, filaments, ropes, tubes, tapes, and similar articles, hereinafter referred to as "thread or the like," may, by the action of the elements of the reel, be continuously wound and axially advanced in the form of a large number of generally helical turns.

The reel of this invention constitutes an improvement upon the type of reel shown, described and claimed in a prior application, for "Winding reel," Serial No. 652,089, filed January 16, 1933. The instant application is in part a continuation of another prior application, entitled "Method and apparatus for processing thread," Serial No. 7,113, filed February 18, 1935, in which prior application are disclosed and broadly claimed unilaterally supported reels adapted to a wide variety of uses in connection with the manufacture, among other things, of artificial silk thread. In the present application are claimed features of novelty not directly related to the thought of supporting the reel from one end only, but equally applicable to such unilaterally supported reels and reels of the ordinary kind.

The reel of the present invention, broadly speaking, comprises two rigid, generally cylindrical reel members rotatably mounted with their axes slightly offset from and inclined to each other. The periphery of each rigid, generally cylindrical reel member comprises a plurality of bar members extending longitudinally of the reel, the bar members of one reel member being disposed alternately with the bar members of the other reel member. The reel members may conveniently, but need not necessarily, be formed of molded synthetic resin. According to the invention, at least one of the reel members is reinforced throughout substantially its entire length by internally disposed annular reinforcing means; so that it presents a more or less drum-like appearance. Other features of the present invention concern, among other things, the manner in which the thread or the like is led onto the reel.

Figure 1:
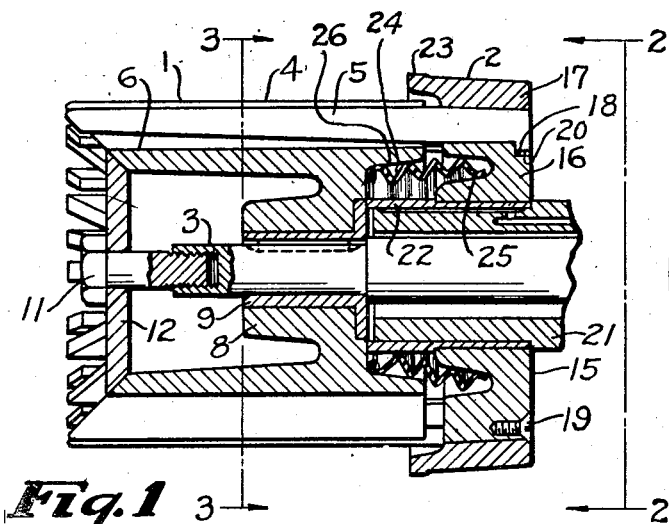
Figure 2:
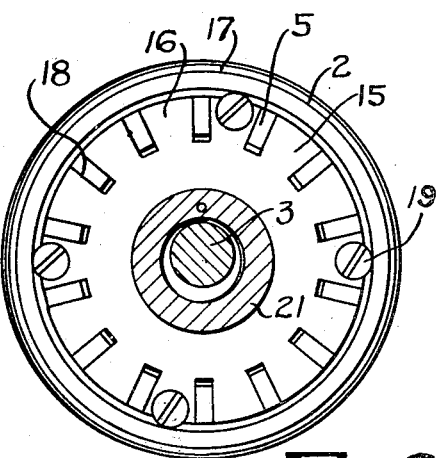
Figure 4:
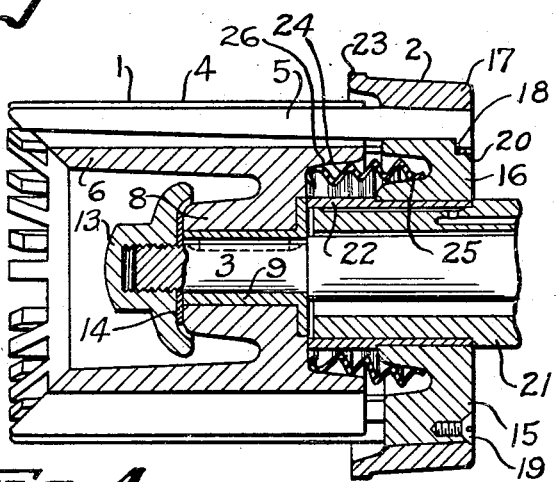
Figure 3:
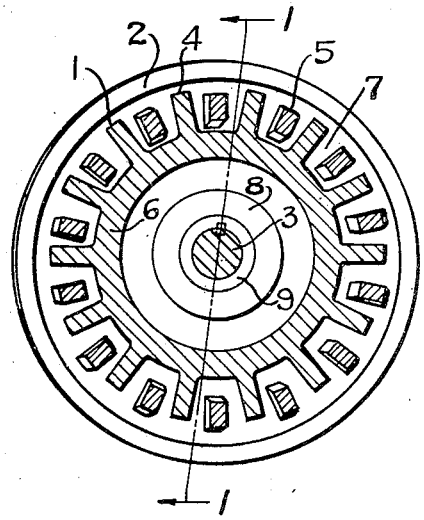
Figure 5:
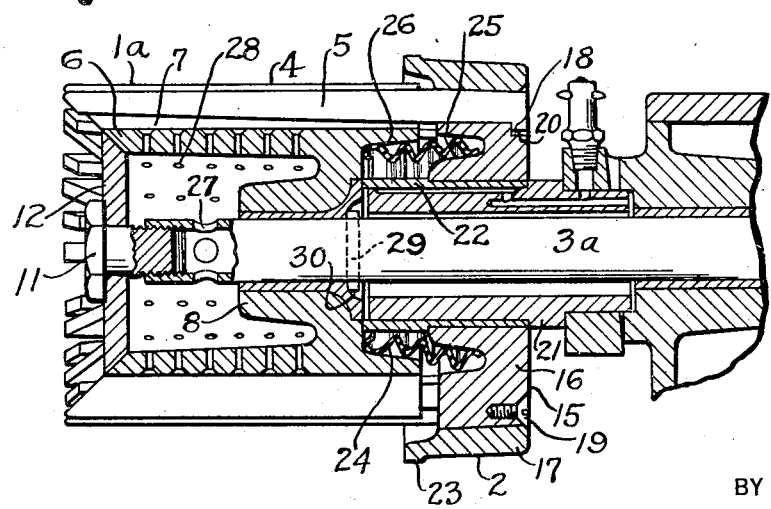

In the drawings, in which like reference numerals refer to like parts throughout, Figure 1 is a longitudinal sectional elevation on line 1—1 of Figure 3 of a reel embodying the features of the present invention. Figure 2 is a rear elevation of the reel of Figure 1. Figure 3 is a sectional elevation on line 3—3 of Figure 1. Figure 4 is a sectional elevation corresponding generally to that of Figure 1 of a slightly modified form of reel likewise embodying the features of the invention. Figure 5 shows, in sectional elevation, still another reel embodying the invention, the same being adapted to the application from the interior of the reel of a processing medium for the thread or the like. Figure 6 illustrates in perspective one of the generally cylindrical reel members going to make up the reel of the invention. Figures 7 and 8 illustrate in perspective the several parts going to make up the other generally cylindrical reel member certain of the parts being shown in Figure 7 as broken away.

From Figures 1 to 4 of the drawings, it will be seen that the reel of the present invention comprises two rigid, generally cylindrical reel members, 1, 2. Each of the component parts of these reel members is immovable, during operation of the reel, with respect to the various other parts of the same member. Member 1, which may be termed the "concentric member," is mounted concentrically upon and for rotation with drive shaft 3 and has a periphery comprising a plurality of spaced longitudinally extending bar members 4. Member 2, which may be termed the "eccentric member," is mounted with its axis askew to that of member 1 and has a periphery comprised of a plurality of spaced longitudinally extending bar members 5 alternately disposed with respect to the bar members 4 of member 1.

As shown to better advantage in Figure 6, concentric member 1 includes a cylindrical or substantially cylindrical body portion 6 supporting the longitudinally extending bar members 4, which are thus separated by recesses 7. The body portion 6 of concentric member 1 may be hollow, as shown, thereby imparting a more or less drumlike appearance to said member. Due to this construction, bar members 4 of concentric member 1 are in effect reinforced substantially throughout their entire length, providing an extremely rigid construction. While the concentric member may be mounted in any one of various ways, it is illustrated as supported by hub 8 rigidly mounted on a sleeve 9 keyed to the drive shaft 3.

In the reel of Figure 1, concentric member 1 is held against a shoulder on the drive shaft by a cap-screw 11 threaded into the shaft, said cap-screw passing through and clamping into position against the outer end of the body portion 6 a suitable disc 12. Disc 12 may assist in preventing the entrance of liquids into the interior of the reel if, as is usually the case, the reel is employed in wet processing operations. In the reel of Figure 4, concentric member 1 is held in place against a shoulder on the drive shaft by a cap nut 13 threaded on drive shaft 3, in which case the nut 13 is contained within the body portion 6 of said member.

Eccentric reel member 2, the construction of which is illustrated to better advantage in Figures 7 and 8, is shown as formed of a plurality of independent bar members 5 rigidly mounted at one end thereof in the head 15, being clamped between inner and outer ring-like members 16 and 17 which together form head 15. Ring-like member 16 may be provided with suitably formed peripheral slots 18 to receive the bar members 5. Outer ring-like member 17 and inner ring-like member 16 may be respectively internally and externally tapered, being preferably held together by screws 19, while bar members 5 may be formed with shoulders 20 to aid in holding the bar members in position.

In Figure 7, the inner ring-like member 16 with some of the bar members 5 inserted therein is shown in perspective, a bar member 5' being shown immediately above its corresponding slot 18'. Bar members 5 are therefore rigidly, demountably supported from one end thereof, being thus removable, if desired, for replacement. Head 15 may be rotatably mounted in the desired askew position on frame member 21, thus providing the desired askew relationship of the axes of the two reel members. A sleeve 22 may be rigidly mounted in the inner ring-like member 16 of the head 15 to provide a bearing surface for the eccentric member 2.

It is further desirable to provide means to guide the thread or the like into the reel. To this end, annular guide rib 23 is formed on the supporting head 15 for the longitudinally extending bar members 5 of the eccentric member 2 at the point at which such supporting head 15 projects over the end of concentric member 1. Were no such annular guide rib provided, the thread or the like might run off the receiving end of concentric member 1 and become tangled: this possibility is precluded by the presence of annular guide rib 23. During the threading up operation, when the thread or the like is wound more or less roughly on the reel, the likelihood of tangling of just this kind is much greater than otherwise. Annular guide rib 23 is effective in preventing such tangling.

To protect that portion of the reel mechanism at the junction of reel members 1 and 2 from the action of any corrosive processing medium that may be used and to prevent the escape of lubricant which may stain thread or the like stored on the reel or contaminate the processing medium, suitable sealing means may be provided. Since there is relative oscillatory movement between reel members 1 and 2, the sealing member preferably should be flexible. A flexible bellows-like sealing member 24 of suitable material, which may take the form shown, has been found satisfactory. In the reel shown, one end of the sealing member is in contact with the external surface of a boss 25 formed on the supporting head 15 of the eccentric reel member and the other end of the sealing member abuts a surface 26 formed on the interior of the concentric reel member.

The reel shown in Figure 5, otherwise of the same general type as the reels previously described, is adapted to supply processing medium from the interior of the reel to the thread or the like stored on the reel.

To this end, a hollow drive shaft 3a is provided which communicates through ports 27 with the interior of concentric member 1a. Concentric member 1a, which may be similar to concentric member 1 of the reel of Figure 1 in that it has a hollow body portion 6 closed by a disc 12 held in place by a cap-screw 11 threaded into the end of the drive shaft, is provided with a plurality of holes 28 which are suitably spaced, preferably in the slots 7 between the bar members 4 of concentric reel member 1a, to provide the desired distribution of the processing medium from the interior of the reel. Concentric member 1a is shown as being located on drive shaft 3a by being held against the projecting ends of a pin 29 through the shaft 3a, which pin may also serve to drive concentric reel member 1a, since the ends of pin 29 may project into a slot 30 in the concentric reel member 1a. Other parts of the reel, such as concentric reel member 2, may be identical with those of the previously described reels.

In all of these reels, rotation of the drive shaft of the reel, by some suitable source of power, causes the concentric reel member to rotate. Contact between bar members 4 of this concentric reel member 1 and bar members 5 of eccentric reel member causes the latter reel member to rotate at the same angular speed. During such rotation, which causes the thread or the like to wind on the reel, the offset relationship of axes of the reel members causes the thread or the like on the reel to transfer from one reel member to the other, while the askew relationship of the generally cylindrical members causes the thread or the like to advance axially along the reel in a plurality of turns. The thread or the like is thus continuously temporarily stored in a plurality of spaced helical turns which are caused to advance axially of the reel in the manner more fully explained in application Serial No. 652,089.

Reels embodying the present invention may be made of various materials, such materials of course being dependent in part on the use to which the reels are put. If, as an example, the reels are used in the processing of artificial silk thread, it is desirable to make the reels of materials not affected by the processing medium used. For instance, depending on the use, the reels may be made of suitable metals, hard rubber, synthetic resins such as phenol-aldehyde condensation products and like materials, or of metals coated with such materials, etc.

If desired, the reel parts may be molded of suitable material; for instance, the concentric reel member shown in Figure 6 may be of an integral molded construction, in which case a high degree of rigidity is obtained. The various parts of eccentric reel member 2, such as the bar members 5 and the inner and outer ring-like members 16 and 17, may likewise be molded. Such molding, which, of course, is equivalent to casting, such as die-casting, in the case of reels made of metal, results in numerous advantages: for instance, reel parts so formed require little finishing since they may be molded with a high degree of accuracy and smoothness, with great uniformity in size and shape of the reel parts, and at relatively low cost.

It will be noted from the drawings that, by simply removing the cap-screw 11 or nut 13, as the case may be, which holds the concentric member 1 on drive shaft 3, either or both concentric member 1 and eccentric member 2 may be readily slipped off the support therefor and thus removed when it is desired to dismount and/or disassemble the reel as for inspection, cleaning, repair, etc. It is obvious that the reel may be just as easily reassembled and remounted. Other advantages of the invention will be apparent to those skilled in the art.

While the reels of this invention have been described for use in handling artificial silk thread, it is obvious that their use is not restricted thereto, since they may store and advance filaments, tapes, bands, tubes, ropes, and, in fact, any article of any material capable of being so stored and advanced. As used in the specification and claims hereof, the terms "mold" and "molded" are to be understood, unless the context otherwise requires, to comprehend casting operations. It is obvious that these and numerous other changes of the nature of modifications may be made in the features of the invention to which is directed the instant specification without thereby departing in any way from the spirit of the invention.

It is intended that the patent shall cover, by suitable expression in the appended claims, whatever features of patentable novelty reside in the invention to which the instant specification is directed.

What is claimed is:

1. A thread-advancing reel comprising a first rotatable reel member embodying a set of spaced, parallel, longitudinally extending bar members and, interfitted therewith, a second rotatable reel member embodying a set of spaced, parallel, longitudinally extending bar members, the bar members of one of said reel members being rigidly mounted on a body portion extending for a considerable distance lengthwise of the reel member.

2. A thread-advancing reel of the character described in claim 1 in which each rotatable reel member is of wholly rigid construction.

3. A thread-advancing reel of the character described in claim 1 in which at least one of said rotatable reel member is of molded construction.

4. A thread-advancing reel of the character described in claim 1 in which said body portion is concentrically mounted on the shaft by means of which the reel is driven.

5. A thread-advancing reel of the character described in claim 1 in which said body portion is disposed concentrically of the axis of rotation of the reel member with which it is associated.

6. A thread-advancing reel of the character described in claim 1 in which one of said reel members embodies annular means for guiding the thread.

7. In a thread-advancing reel, a reel member constituting one element of said thread-advancing reel comprising a body portion extending for a considerable distance lengthwise of the reel members having rigidly mounted on its periphery a set of spaced, parallel, longitudinally extending bar members which are of such shape and so spaced that the recesses therebetween are adapted to receive a cooperating set of spaced, parallel, longitudinally extending bar members.

8. A reel member of the character described in claim 7 in which the spaced, parallel, longitudinally extending bar members mounted on said body portion extend to at least one of the ends thereof.

9. A reel member of the character described in claim 7 in which the spaced, parallel, longitudinally extending bar members mounted on said body portion extend beyond said body portion at one end thereof.

10. A reel member of the character described in claim 7 in which said body portion and the spaced, parallel, longitudinally extending bar members mounted on said body portion are integral.

11. A reel member of the character described in claim 7 which is of molded construction.

12. In a thread-advancing reel, a reel member constituting one element of said thread-advancing reel comprising a first annular mating member, a second annular mating member adapted to fit within said first annular mating member, and, associated in rigid relation with one of said mating member, a set of spaced, parallel, longitudinally extending bar members the spaces between which are adapted to receive a cooperating set of spaced, parallel, longitudinally extending bar members.

13. A reel member of the character described in claim 12 which is of wholly rigid construction.

14. A reel member of the character described in claim 12 made up of parts of molded construction.

15. A reel member of the character described in claim 12 in which one of said mating members has connected thereto a longitudinally extending bearing sleeve.

16. A reel member of the character described in claim 12 in which the outer of said annular mating members embodies a circumferential flange which surrounds a portion of the periphery defined by the bar members of said reel member.

17. A thread-advancing reel comprising a first reel member embodying a set of spaced, parallel, longitudinally extending bar members and, interfitted therewith, a second reel member embodying a set of spaced, parallel, longitudinally extending bar members, one of said reel members having rigidly affixed thereto an external flange which extends radially of the periphery defined by the bar members of the reel member.

18. A thread-advancing reel comprising two rigid reel members made up of longitudinally extending bar members, the bar members of said reel members alternating with each other to define a thread-bearing periphery having a substantially circular cross-section; means for supporting said reel members with their axes in eccentric relationship; and, fixed to at least one of said reel members, annular reinforcing means taking the form of a continuous external rib.

19. A thread-advancing reel of the character described in claim 18 in which reinforcing means formed integrally with one of said reel members extend substantially throughout the length of said reel member.

20. A thread-advancing reel of the character described in claim 18 having as an integral part of one of said reel members reinforcing means taking the form of a hollow cylinder.

WALTER F. KNEBUSCH.